United States Patent
Klatsky et al.

(10) Patent No.: US 12,267,247 B2
(45) Date of Patent: Apr. 1, 2025

(54) PACKET REPLICATION AND USAGE MONITORING IN A NETWORK ENVIRONMENT

(71) Applicant: Comcast Cable Communications, LLC, Philadelphia, PA (US)

(72) Inventors: Carl Klatsky, Yardley, PA (US); De Fu Li, Nashua, NH (US); Jason Combs, Cherry Hill, NJ (US); Aju Francis Kalarickal, Chantilly, VA (US); Jimit Salvi, Reston, VA (US); Basil Baby, Chantilly, VA (US); Himalay Gopu, Ashburn, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 4 days.

(21) Appl. No.: 18/344,034

(22) Filed: Jun. 29, 2023

(65) Prior Publication Data

US 2025/0007851 A1    Jan. 2, 2025

(51) Int. Cl.
| | |
|---|---|
| *H04L 29/08* | (2006.01) |
| *H04L 9/30* | (2006.01) |
| *H04L 12/66* | (2006.01) |
| *H04L 17/00* | (2006.01) |
| *H04L 47/2475* | (2022.01) |

(52) U.S. Cl.
CPC .......... *H04L 47/2475* (2013.01); *H04L 12/66* (2013.01)

(58) Field of Classification Search
CPC ..... H04L 47/2475; H04L 12/66; H04L 29/08; H04L 9/30; H04L 17/00

USPC .......................................................... 709/238
See application file for complete search history.

(56) References Cited

U.S. PATENT DOCUMENTS

| | | | |
|---|---|---|---|
| 6,216,135 B1 * | 4/2001 | Brodersen | G06F 11/1471 707/999.102 |
| 6,446,089 B1 * | 9/2002 | Brodersen | G06F 16/278 |
| 9,155,103 B2 | 10/2015 | Wietfeldt et al. | |
| 9,967,165 B2 | 5/2018 | Arora et al. | |
| 10,802,856 B1 | 10/2020 | Matatyaou et al. | |
| 11,452,110 B1 | 9/2022 | Jorgovanovic et al. | |
| 2014/0207850 A1 * | 7/2014 | Bestler | H04L 12/1877 709/203 |
| 2014/0304357 A1 * | 10/2014 | Bestler | H04L 67/1097 709/213 |
| 2016/0057226 A1 * | 2/2016 | Bestler | H04L 12/18 709/217 |

(Continued)

FOREIGN PATENT DOCUMENTS

WO    2017058564 A1    4/2017

*Primary Examiner* — Jude Jean Gilles
(74) *Attorney, Agent, or Firm* — Banner & Witcoff, Ltd.

(57) ABSTRACT

Systems, apparatuses, and methods are described for replicating data packets at individual compute (e.g., VCMTS) nodes and sending the replicated data packets to a gateway via a tunneling protocol. The gateway determines traffic data related to usage and telemetry based on the replicated data packets. Partial replication of the data packets, for example, replicating the headers only, may further reduce network I/O bandwidth and support higher customer scale. The partially replicated data packets may be used for data related to usage such as whether a user watched or interacted with content such as advertisements and provide basis for decision-making regarding the content.

22 Claims, 14 Drawing Sheets

(56) References Cited

U.S. PATENT DOCUMENTS

| | | | |
|---|---|---|---|
| 2016/0191509 A1* | 6/2016 | Bestler | H04L 63/0876 |
| | | | 713/193 |
| 2019/0068697 A1* | 2/2019 | Darby, III | G06F 9/5072 |
| 2021/0014001 A1* | 1/2021 | Yilmaz | H04L 45/74 |

* cited by examiner

PACKET REPLICATION AND USAGE MONITORING IN A NETWORK ENVIRONMENT

BACKGROUND

In a network environment involving virtual network components (or functions), scaling may be needed to accommodate the growing service needs of customers. Moreover, keeping track of user interactions with content, for example, TV programs, videos, and advertisements, has become important.

SUMMARY

The following presents a simplified summary of certain features. The summary is not an extensive overview and is not intended to identify key or critical elements.

Systems, apparatuses, and methods are described for replicating data packets at individual compute nodes and sending the replicated data packets to a gateway (e.g., virtual service gateway) via a tunneling protocol. The compute nodes may comprise VCMTS nodes according to some embodiments. The gateway may determine traffic data related to usage and telemetry based on the replicated data packets. Upstream and downstream packets may be separately replicated at individual compute nodes and separately sent to the gateway. The gateway may comprise a plurality of gateway elements and may be scalable by adding one or more gateway elements based on capacity needed at individual compute nodes that are associated with the gateway. Partial replication of the data packets, for example, replicating the headers only, may further reduce network input and/or output (I/O) bandwidth and support higher customer scale. The partially replicated data packets may be used for tracking usage such as whether a user watched or interacted with content such as advertisements and provide basis for decision-making regarding the content.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
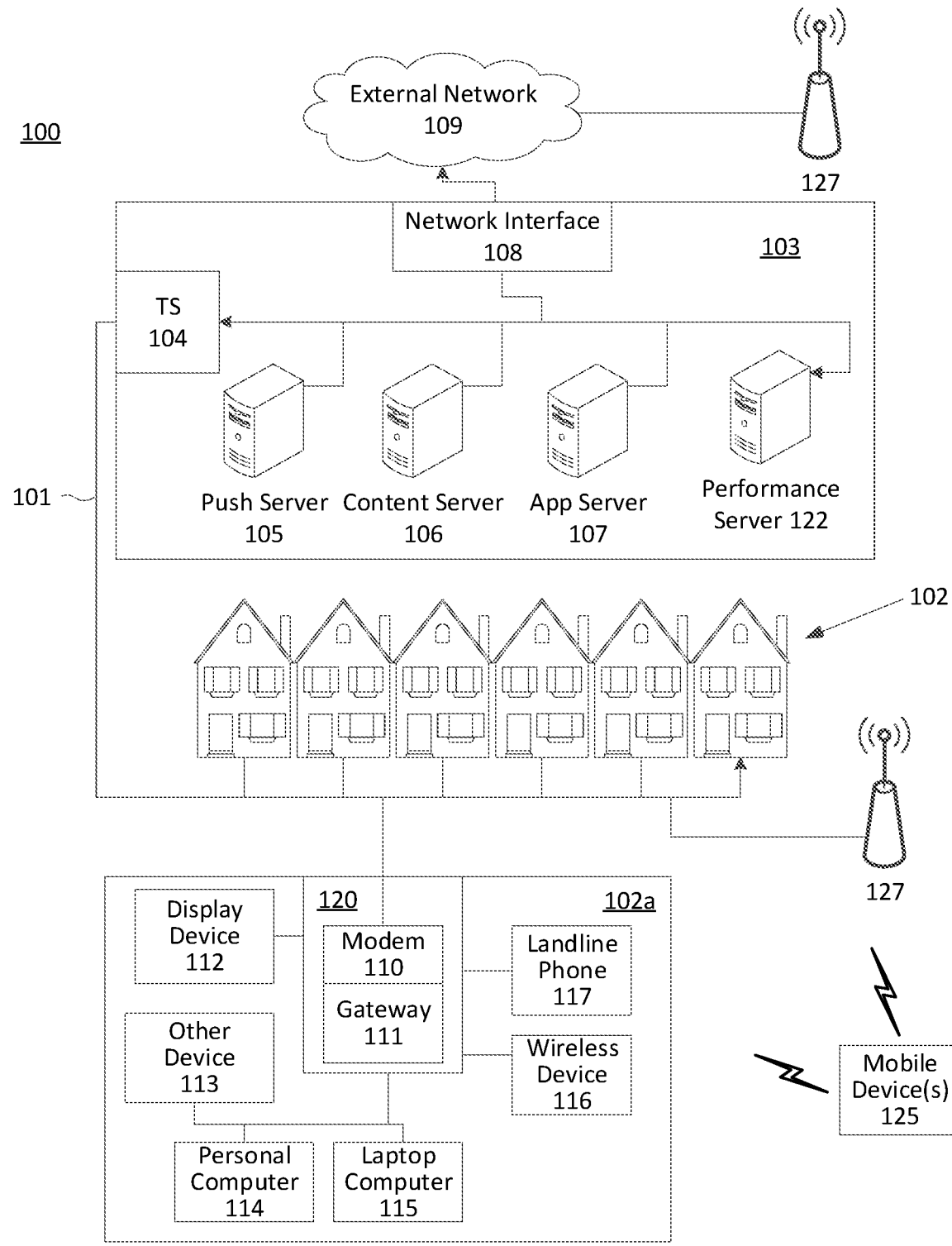
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5 G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The interface 104 may comprise a virtual cable modem termination system (referred to herein as a virtual CMTS, or VCMTS). The VCMTS may be a software implemented CMTS that executes upon a hardware computer system, for example, one or more commercial off-the-shelf (COTS) packet switch and/or routers and/or COTS computing servers. The VCMTS may comprise all the higher-level functions of Data Over Cable Service Interface Specification (DOCSIS), including the Medium Access Control (MAC) functions. The VCMTS may communicate with Remote physical layer (or PHY) Device (RPD) via optical link, using Internet Protocol (IP) packet format. The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the performance server 122 (described below), additional push, content, and/or application servers, and/or other types of servers. The performance server 122 may be configured to receive data related to usage and telemetry from the termination system 104 (e.g. VCMTS) and to send management data, for example, to the termination system 104 (e.g. VCMTS) and/or its components such as VSG (Virtual Services Gateway). Although shown separately, the push server 105, the content server 106, the application server 107, the performance server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, for example, display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g., Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
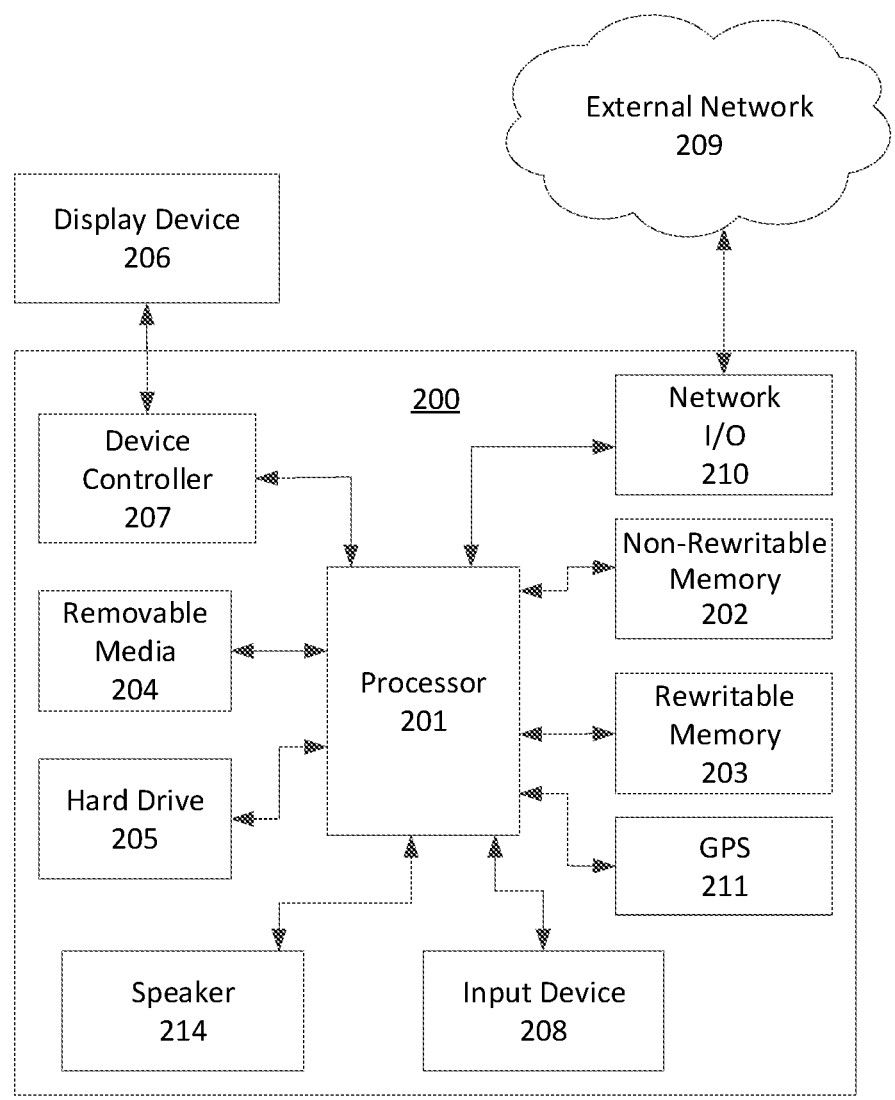
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., VSG). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Features herein may provide an approach to interconnecting virtualized network components (or functions) to allow usage tracking and easy scaling to additional capacity for accommodating the growing service needs of network users (e.g., customers). The approach may involve removing usage tracking component(s) (e.g., virtual gateway(s)) from user traffic data path and feeding the usage tracking component(s) with packets replicated from the user traffic data path. The packets may be replicated at each individual compute node. The usage tracking component(s) may scale incrementally (e.g., by adding individual gateway elements), based on needed capacity of each individual compute node instead of an aggregated capacity. The packets may be partially replicated (e.g., headers only). User interaction with content such as advertisements may be tracked by the usage tracking component(s), based on replicated headers from individual compute nodes. The approach will be described below in detail using Virtual Cable Modem Termination System (VCMTS) as an example of an virtual network environment and Virtual Services Gateway (VSG) as an example of the virtual gateway. It should be noted that, applications are not limited to VCMTS or VSG.

Figure 12:
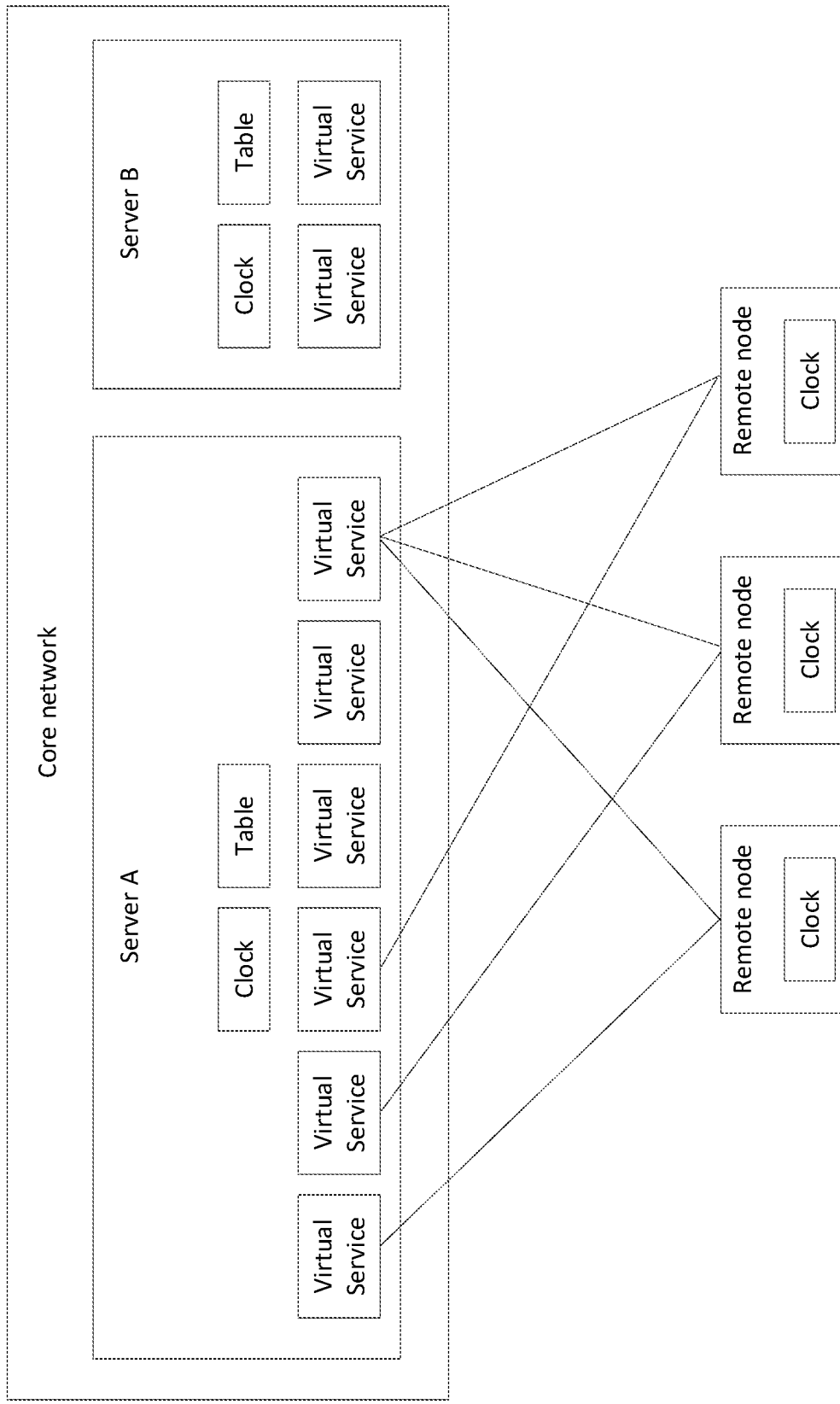
FIG. 12 shows an example system that involves VCMTS.

FIG. 12 shows an example system that involves VCMTS. The virtual services may comprise, for example, virtual machines or any other computing container configured to implement one or more functions of the core network. For example, the virtual series may comprise virtual CMTSs (vCMTSs). Each remote node (e.g., RPD) of the remote nodes may be associated with a virtual service (e.g., a vCMTS). A remote node and an associated virtual service may together carry out the functions of an access network protocol stack (e.g., a CMTS protocol stack). The remote node may implement some components of the access network protocol stack, and the virtual service may implement some other components of the access network protocol stack. For example, the remote node may implement some or all of the physical layer functions, and the virtual service may implement some or all of the media access control (MAC) layer or upper layer functions. Additional systems involving VCMTS are described in U.S. patent publication No. US 2020/0343988 A1 which is herein incorporated by reference in its entirety.

Figure 13:
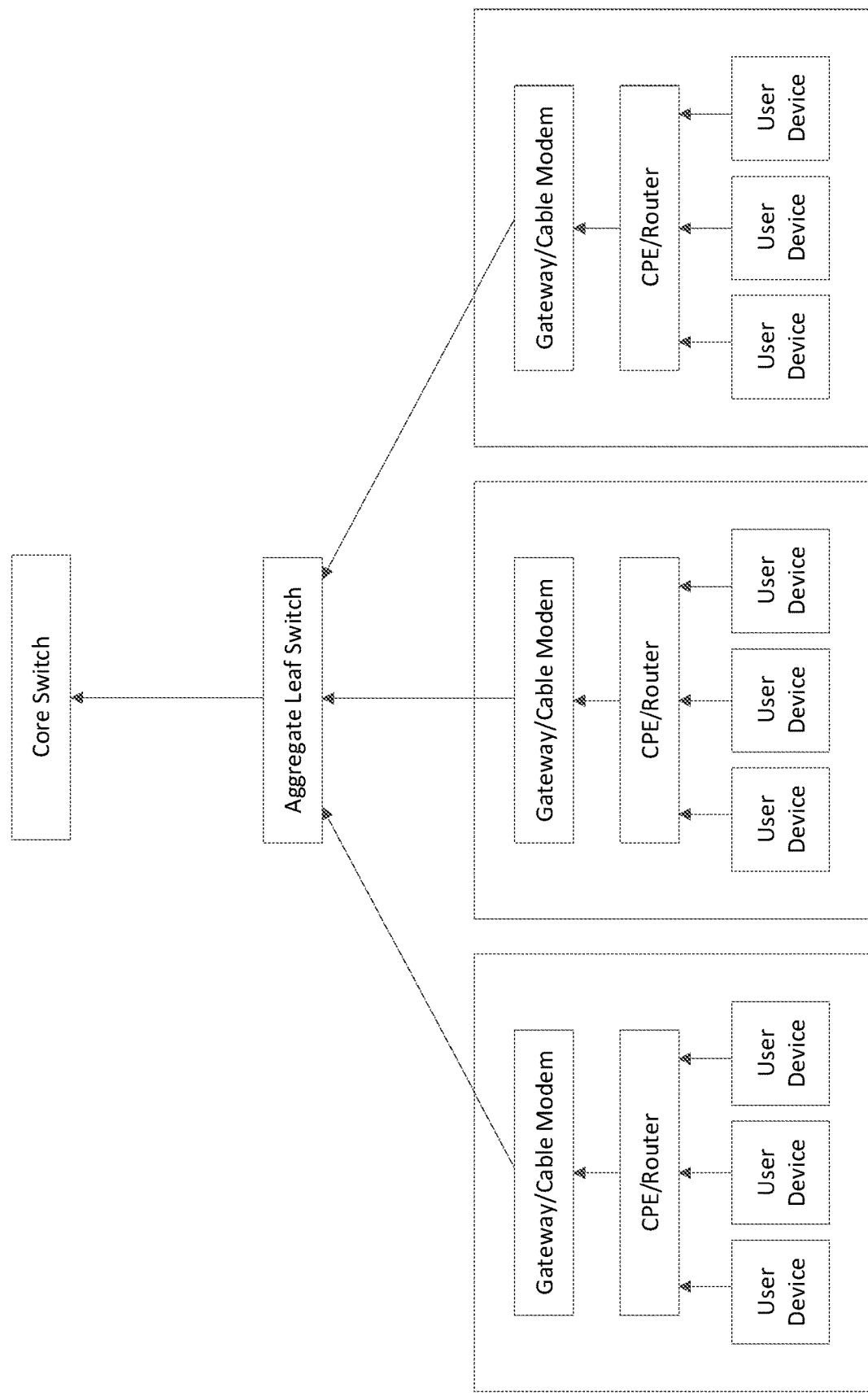
FIG. 13 shows an example data plane architecture that involves an aggregate leaf switch.

FIG. 13 shows an example data plane architecture that involves an aggregate leaf switch. The data plane architecture may be configured to service a plurality of user devices, such as laptops, consoles, and cameras, associated with a plurality of end users. In this example, each device may be connected with a CPE and/or Router on the user premises. The individual CPEs and/or Routers may operably connect to a respective gateway and/or modem. In some embodiments, the CPE and/or Router and the gateway and/or modem are integrated into the same device. In other embodiments, the CPE and/or Router and the gateway and/or modem are separate devices, which may be remotely located from one another. The gateway connects the devices to the core network through an aggregate leaf switch, and the aggregate leaf switch connects to a core switch. In the exemplary embodiment, the aggregate leaf switch and the core switch are P4-enabled. In some embodiments, one or more additional devices may be disposed between the P4 enabled switches, including without limitation an Optical Communications Module Link Extender (OCML), a DPA, and a modem termination system (MTS) or a cable MTS (CMTS). Additional examples of data plane architecture are described in U.S. patent publication No. US 2020/0021490 A1 which is herein incorporated by reference in its entirety.

Figure 3:
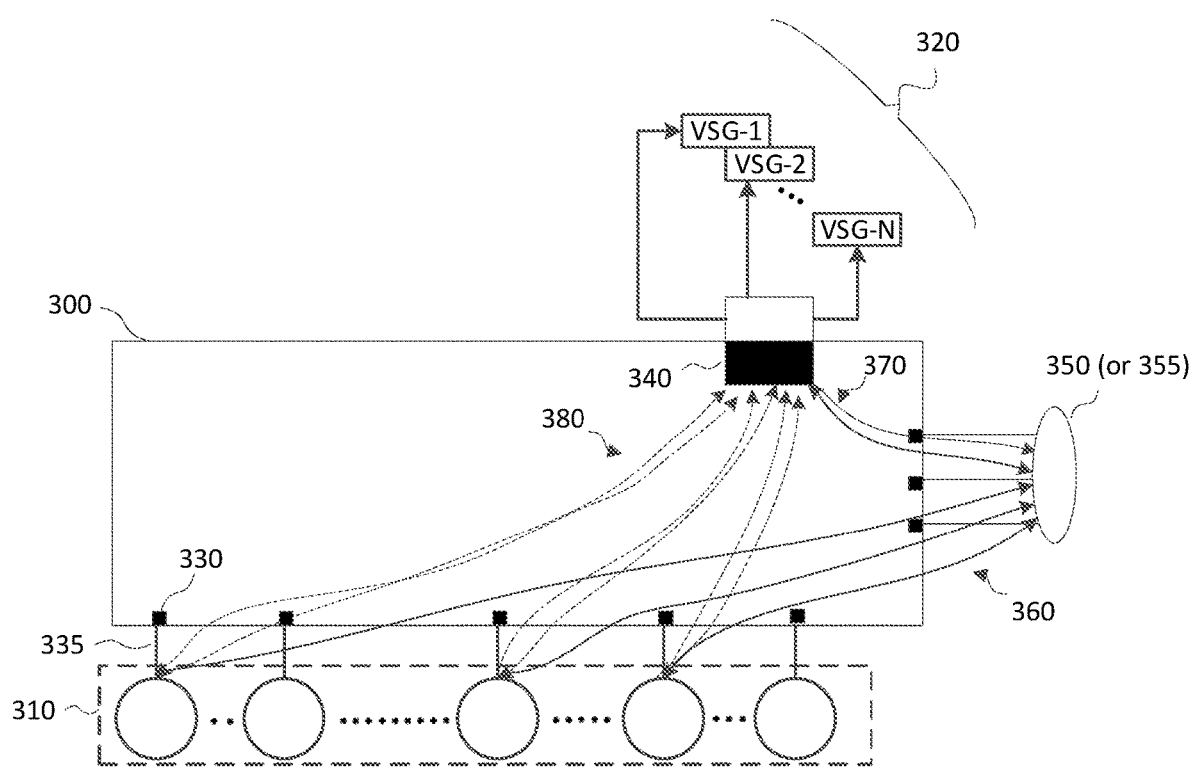
FIG. 3 shows an example of the interconnection between compute nodes and gateways.

In a virtual network environment, for example, the VCMTS, there may be one or more compute nodes (e.g., virtual compute nodes or virtual nodes, VCMTS nodes). These one or more compute nodes may connect to a lower-level switch (e.g., leaf switch 300 as shown in FIG. 3). The lower-level switch may be a commercially available leaf switch such as ARISTA 7280CR3-32D4 series. The one or more compute nodes may be a data plane for sending data downstream and for sending data upstream. The lower-level switch may be either one of a lower-level switch pair (e.g., leaf-A switch and leaf-B switch). The two lower-level switches in the lower-level switch pair may be interconnected and may further connect to upper-level switches (e.g., spine switches). The lower-level switch may connect to an edge router such as a residential united router (RUR). The RUR or the edge router may route information to and from the network. For example, the RUR may be a pathway onto the internet for cable modems through the VCMTS. The data may be passed to the upper-level switches, and to a plurality of distributed access architecture switches (DAAS switches), which may be connected to a plurality of remote physical devices (RPHYs). The RPHY may be located next to one of the servers executing the VCMTS software or could be located at another location, such as miles apart from the server and/or downstream from the server. The RPHY may be a node with a remote physical device (RPD). The data may be passed to metro aggregation switch (MAGG), hub aggregation switch (HAGG), etc. The data may be in the form of packets (or data packets). A packet may be a formatted unit of data that can contain control or routing information (e.g., source and destination address, etc.) and data (or payload). Control or routing information, management information, etc. may be included in packet fields, such as within header(s) and/or trailer(s) of packets. Examples of packets may include IP version 4 (IPv4) packets, IP version 6 (IPv6) packets, Gateway-to-Gateway Protocol (GGP) packets, OPENFLOW packets, Internet Group Message Protocol (IGMP) packets, Transmission Control Protocol (TCP) packets, combinations of one or more of the same, or any other suitable packet. The lower-level switch (e.g., leaf switch) may be connected with one or more gateways (e.g., virtual gateways, VSGs). Data packets passing the compute nodes (e.g., VCMTS nodes) may be copied (or replicated) and sent to the one or more gateways (e.g., virtual gateways, VSGs) for usage and telemetry information related to customers' use of the network.

FIG. 3 shows an example of the interconnection between compute nodes 310 and gateways 320. A lower-level switch (e.g., leaf switch) 300 may have a plurality of interfaces 330 (e.g., ports) for connecting to other network components such as compute nodes 310, an edge router (e.g., RUR) 350, gateways (e.g., virtual gateways, VSGs) 320, another lower-level switch (e.g., leaf switch, not shown), etc. For example, the compute nodes 310 may comprise VCMTS nodes 310. FIG. 3 shows a plurality of example interfaces 330 and an example interface 340. Each interface 330 may be a 100 G (Gbps) port, and each interface 340 may be a 400 G (Gbps) port. The interfaces 330 may be used to connect the lower-level switch 300 to the compute nodes 310 and the edge router (e.g., RUR) 350. For example, one interface 330 (e.g., a 100 G port) may be connected to one compute node 310 via a link 335. For example, three interfaces 330 (e.g., 3×100 G interfaces) may be connected to the edge router (e.g., RUR) 350. The interface 340 may be used to connect the lower-level switch 300 to the gateways 320. Another two interfaces 340 (not shown) may be used to connect the lower-level switch 300 to another lower-level switch. The interface 340 may be broken out to a plurality of interfaces 330. For example, the interface 340 may be a 400 G port and may be broken out to 4×100 G, and each 100 G may be connected to a gateway 320. For example, there may be two interfaces 340 (e.g., each a 400 G port; not shown) cross-connecting to another lower-level switch (e.g., the other switch in the lower-level switch pair). The interfaces 330 and 340 shown in FIG. 3 are exemplary and there may be more interfaces 330 and/or 340 on the lower-level switch 300. For example, there may be interfaces connecting to DAAS, RPD, and aggregation switches such as MAGG, HAGG. The numbers (or quantities) of gateways 320 and compute nodes 310 as shown in FIG. 3 are also exemplary. For example, there can be any number of gateways 320 (i.e., VSG-1 to VSG-N, as shown in FIG. 3). Additionally, lower-level switch 300 may accommodate any number of compute nodes 310. In some use cases, for example, there may be 24 compute nodes 310 (e.g., 24 compute nodes running VCMTS containers) connected to the lower-level switch 300. These 24 compute nodes 310 may operate in 3+1 protection mode, and 18 out of the 24 compute nodes 310 may be active at a time. These 24 compute nodes 310 may correspond to four gateways 320. Each gateway 320 may serve six compute nodes 310. Each compute node 310 may serve a plurality of service groups, for example, 15 service groups. Each service group may have a maximum capacity, for example, 3.5 Gbps (e.g., 3 Gbps downstream, 0.5 Gbps upstream). The number of service groups per compute node 310 and/or the maximum traffic rate per service group may be changed, so that the capacity (e.g., 100 G) of each link 335 connecting to the compute node 310 is not exceeded. Moreover, packet copy function at each compute node 310 (as will be described below) may double the packet rate on the lower-level switch 300—the 100 Gbps interface 330 which connects the compute node 310. In that situation, if a compute node 310 still serves 15 service groups, the original maximum capacity of each service group being 3.5 Gbps may not work, as 15×3.5×2=105 exceeds 100 (Gbps). The maximum traffic rate per service group may be reduced to, for example, 1 Gbps. If the maximum capacity for each service group needs to be unchanged, for example, still 3.5 Gbps, fewer service groups may be served. A compute node 310 may serve, for example, 4 service groups.

In FIG. 3, there are also curved lines 360, 370, and 380 showing data packet flows. The solid curved lines 360 show the original customer data packets that go from the compute nodes 310 to external networks (e.g., internet) via the edge router (e.g., RUR) 350 (upstream data packets or upstream packets) and that go from the external networks (e.g., internet) via the edge router (e.g., RUR) 350 to the compute nodes 310 (downstream data packets or downstream packets). The downstream data packets may be related to any content, such as on-demand videos, television programs, web pages, text listings, advertisements, etc. The upstream data packets may be related to any data from the customers (or users, subscribers, etc.), such as uploaded videos, images, texts, files, interactions with programs, reactions to advertisements, etc. The solid curved lines 370 show data packets between the gateways 320 and the external networks (e.g., internet) (via the edge router (e.g., RUR) 350). For example, the data packets from the gateways 320 may go to a management device 355. The management device 355 may be a computing device such as the performance server 122. The data packets from the gateways 320 may be related to telemetry and usage, such as Quality of Service (QOS), customer usage, etc. The data packets to the gateways 320 may be related to management data for managing the gateways 320, for example, adding a gateway (e.g., VSG) element, upgrading the gateways (e.g., VSGs), etc. The dotted curved lines 380 show data packets that are from the compute nodes 310 to the gateways 320. These data packets may be wholly or partially replicated customer data packets from each of the compute nodes 310. They may be sent to the gateways 320 for analysis purpose. This will be described in detail later in this specification. The dotted curved lines 380 may also show data packets that are from the gateways 320 to the compute nodes 310. This direction of data flow may be possible and may allow the gateways 320 to impact the main data flow. For example, the gateways 320 may add insertion (e.g., advertisements) to a stream of packets. For example, the gateways 320 may act like a cloud. The gateways 320 may replicate data of streaming videos (e.g., a movie from PEACOCK channel) and serve the data back to the local compute nodes 310, so that the consumption for bandwidth in the main network may be reduced, as these videos need not be obtained from a server (e.g., a home server of PEACOCK channel) that may be located a long distance away. For another example, the gateways 320 may serve as a local server and provide services to businesses. The gateways 320 may host, for example, an email service locally. These local services may provide higher throughout and lower latency, compared to going to an email server that may be located a long distance away. Although the dotted curved lines 380 in FIG. 3 may show bidirectional data flows, the data flows between the compute nodes 310 and the gateways 320 may be unidirectional, which may be from the compute nodes 310 to the gateways 320.

For clarity (and to prevent an overly cluttered rendering), FIG. 3 shows several of the compute nodes 310 without a connection to the data packet flow lines. However, it should be understood that the same data packet flows described above may occur for all compute nodes 310 connected to the lower-level switch 300. In addition, in some instances, some of the compute nodes 310 may lack some of the above-described packet flows (e.g., curved lines 380). For example, in a situation where there is lawful interception, at least some of the compute nodes 310 may not have data packet flows to the gateways 320. In this example, the system could be configured to allow law enforcement agencies to pick specific user traffic thereby accommodating the need to intercept those packets for security reasons. In that situation, those packets may be flagged and get a different policy treatment. They will not be replicated and/or sent to the gateways 320.

Figure 4:
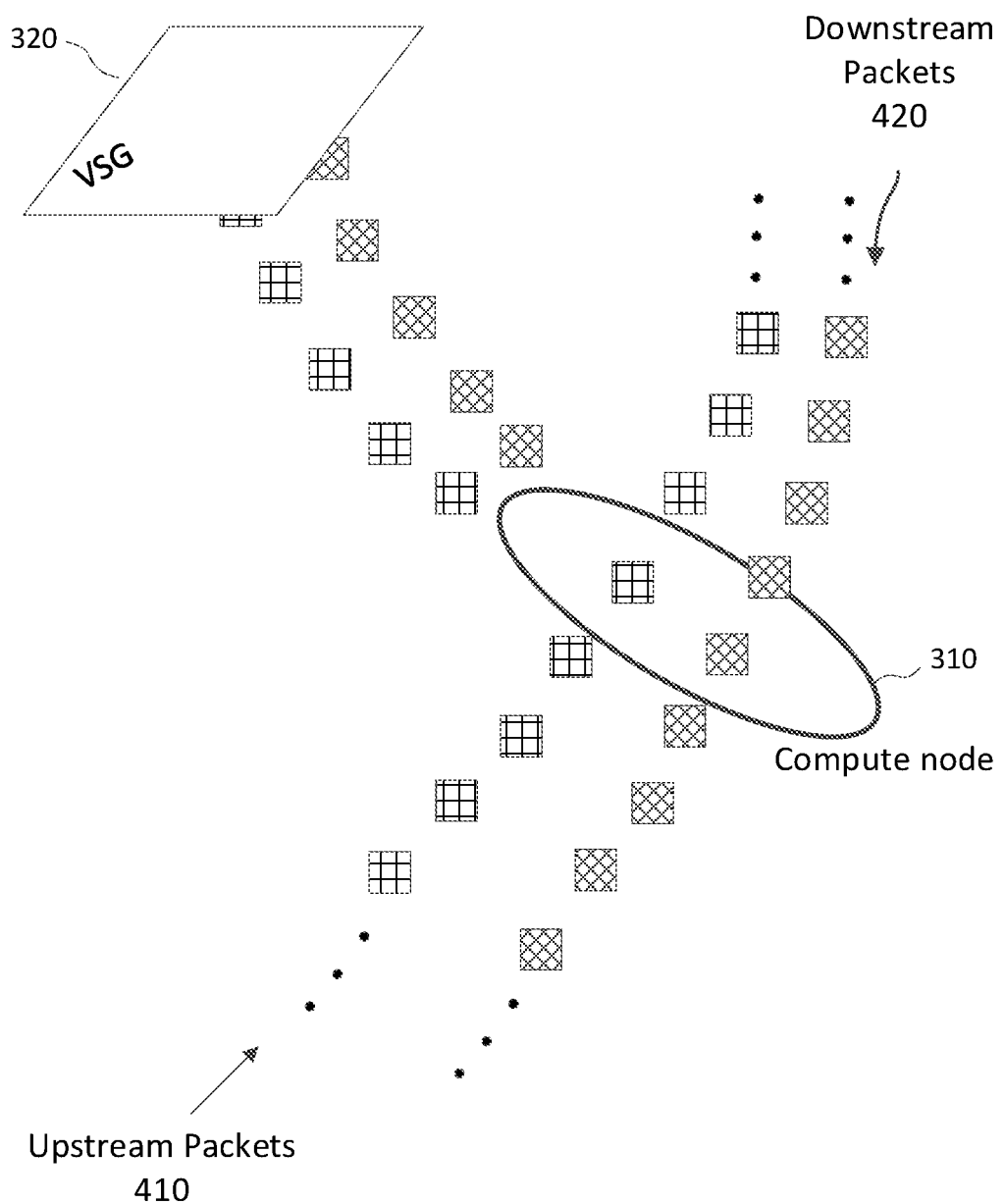
FIG. 4 shows an example of upstream packets and downstream packets passing an individual compute node, and being replicated and sent to gateway.

FIG. 4 shows an example of upstream packets 410 and downstream packets 420 passing an individual compute node (e.g., VCMTS node) 310, and being replicated and sent to gateway (e.g., VSG) 320. As described above, the original customer data packets may pass the compute nodes 310 to get to local devices such as modems and/or to the external networks (e.g., internet) via the edge router 350. Gateway 320 may be used to monitor the data traffic and provide QoS and customer usage data. Instead of making the upstream packets 410 and downstream packets 420 pass through gateways 320 directly in the traffic path, the upstream packets 410 and downstream packets 420 may be replicated separately at the compute node 310 and sent to the gateway 320 which is off the traffic path for analysis. This arrangement may reduce the impact on the data traffic and make scaling of the gateway 320 more accessible. The scaling may be horizontal rather than vertical. Moreover, if failure happens, a failure domain may be much smaller compared to if the gateways 320 are in the traffic path. The replication of packets may be performed by using software such as VCMTS application software and/or the firmware on the VCMTS Network Interface Card (NIC) at the compute node 310. As described previously, the maximum capacity and/or number of service groups served by a compute node 310 may be designed to not exceed the capacity (e.g., 100 G) of each link 335 (see FIG. 3) connecting to the compute node 310, considering the doubled number of packets passing the link 335. The packets may be replicated in full or partially (e.g., copying header only). The consumption of the bandwidth on the link 335 when full packet copying is conducted may add up quickly. Partial packet copying may lead to a more efficient design for gathering telemetry, QoS, and customer usage data.

The replicated upstream packets 410 and downstream packets 420 may be separately sent to gateway 320 via a tunneling protocol. The tunneling protocol may be any common protocol tunnel such as patch panels, VXLAN, IP-GRE, L2VPN, etc. For example, in the case of using a patch panel packet forwarding function of a network switch (e.g., leaf switch 300), the replicated upstream packets 410 and downstream packets 420 may be tagged with separate VLAN IDs and may be routed across the switch to the gateway 320 using the patch panel function. Each lower-level switch compute node interface 330 may have two patch panels, one for the replicated upstream packets 410, and one for the replicated downstream packets 420. For example, a side-A of a 1st patch panel may be a compute node interface 330 using upstream VLAN ID, and a side-B of the 1st patch panel may be gateway interface 340 using upstream VLAN ID. A side-A of a 2nd patch panel may be a compute node interface 330 using downstream VLAN ID, and a side-B of a 2nd patch panel may be gateway interface 340 using downstream VLAN ID. Specific upstream and/or downstream VLAN IDs may be defined based on compute node order, with each compute node 310 using a unique upstream and/or downstream VLAN ID pair. For another example, in the case of using VXLAN method of a network switch (e.g., leaf switch 300), the VCMTS application software and/or the NIC at the compute node 310 may originate a VXLAN tunnel to send the replicated upstream packets 410 to gateway 320 which may terminate the VXLAN tunnel using software such as VSG application software and/or the NIC at the gateway (e.g., VSG) 320. Similarly, the software such as VCMTS application software and/or the NIC at the compute node 310 may originate a VXLAN tunnel to send the replicated downstream packets 420 to gateway 320 which may terminate the VXLAN tunnel using software such as VSG application software and/or the NIC at the gateway 320.

Figure 5:
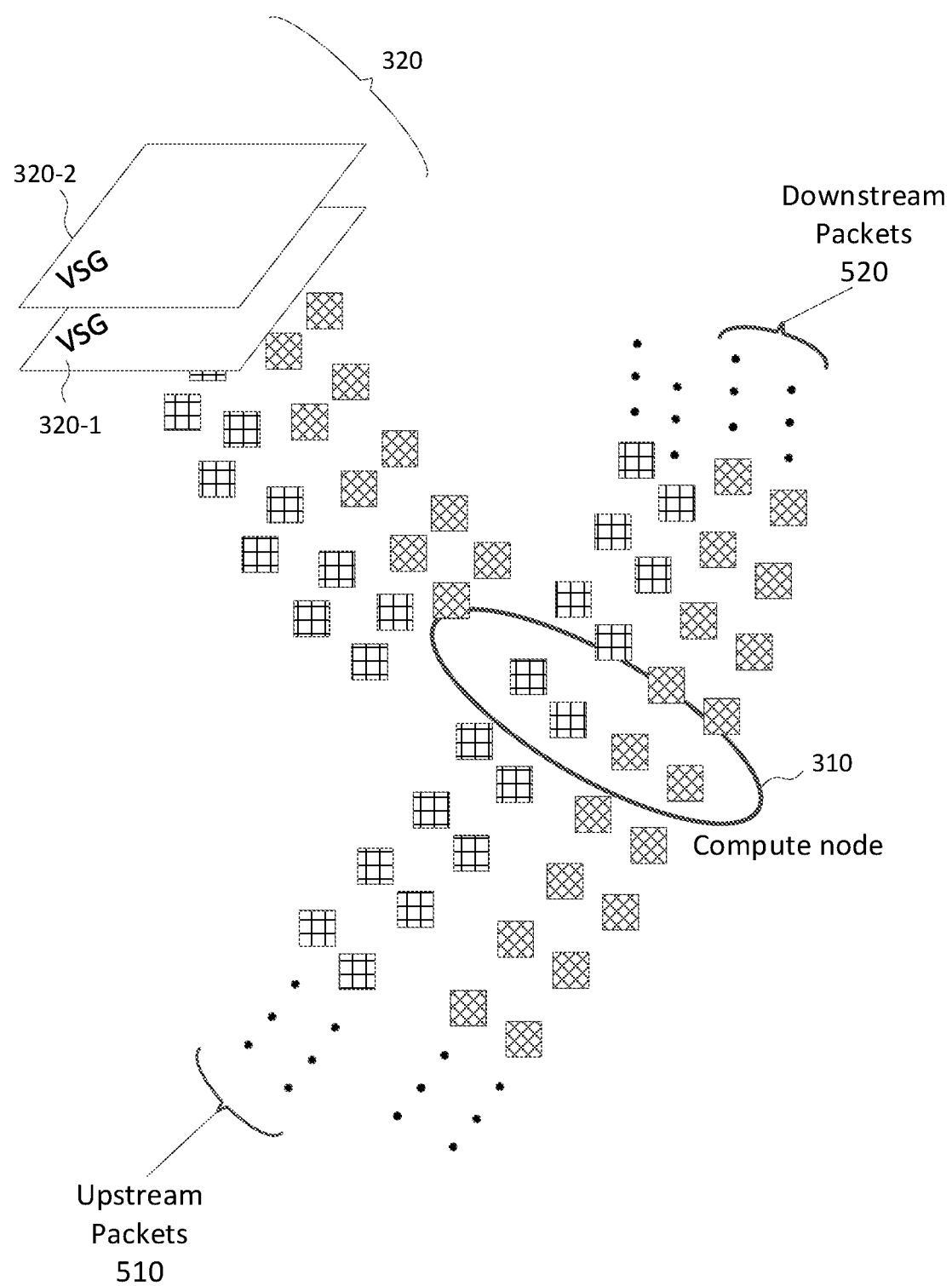
FIG. 5 shows an example of adding a gateway element based on increased volumes of upstream and downstream packets.

FIG. 5 shows an example of adding a gateway element based on increased volumes of upstream and downstream packets 510 and 520. In FIG. 5, the number of upstream packets 510 and downstream packets 520 that pass through the compute node (e.g., a VCMTS node 310) have increased (e.g., doubled). The upstream and downstream packets replicated at the compute node 310 and sent to the gateway (e.g., VSG) element 320-1 have correspondingly increased (e.g., doubled). With this increased traffic at the compute node 310, the gateway element 320-1 may need scaling in order to support the compute node 310. A gateway element 320-2 may be added to increase the capacity of the gateway 320. The gateway element 320-1 and the gateway element 320-2 may have the same capacity. By performing packet replication at each individual compute node 310, the needed capacity may be determined by the traffic and/or capacity of the individual compute node 310, instead of using the capacity of the aggregate capacity of the full VCMTS network element at higher network layer. If the capacity is based on each individual compute node 310, individual gateway element may be added using a fixed capacity, adding as many gateway elements as needed, instead of trying to make a single gateway with higher capacity to serve the full VCMTS. Thus, scaling has become easier. The gateway 320 may run on bare metal or may be containerized. By containerizing the gateway, gateway availability may be further improved. For example, a bare metal server may have significant longer downtime compared to restarting a containerized workload. The gateway and other network components (e.g., VSG and VCMTS applications) may run co-resident on the same compute node 310. The gateway and other network components (e.g., VSG and VCMTS applications) may run on separate compute nodes 310. Because the gateway scale and performance are I/O bounded, partially replicating the packets (e.g., replicating the packet headers only) may further significantly reduce the network I/O bandwidth and enable gateway to support at a higher customer scale.

Figure 6:
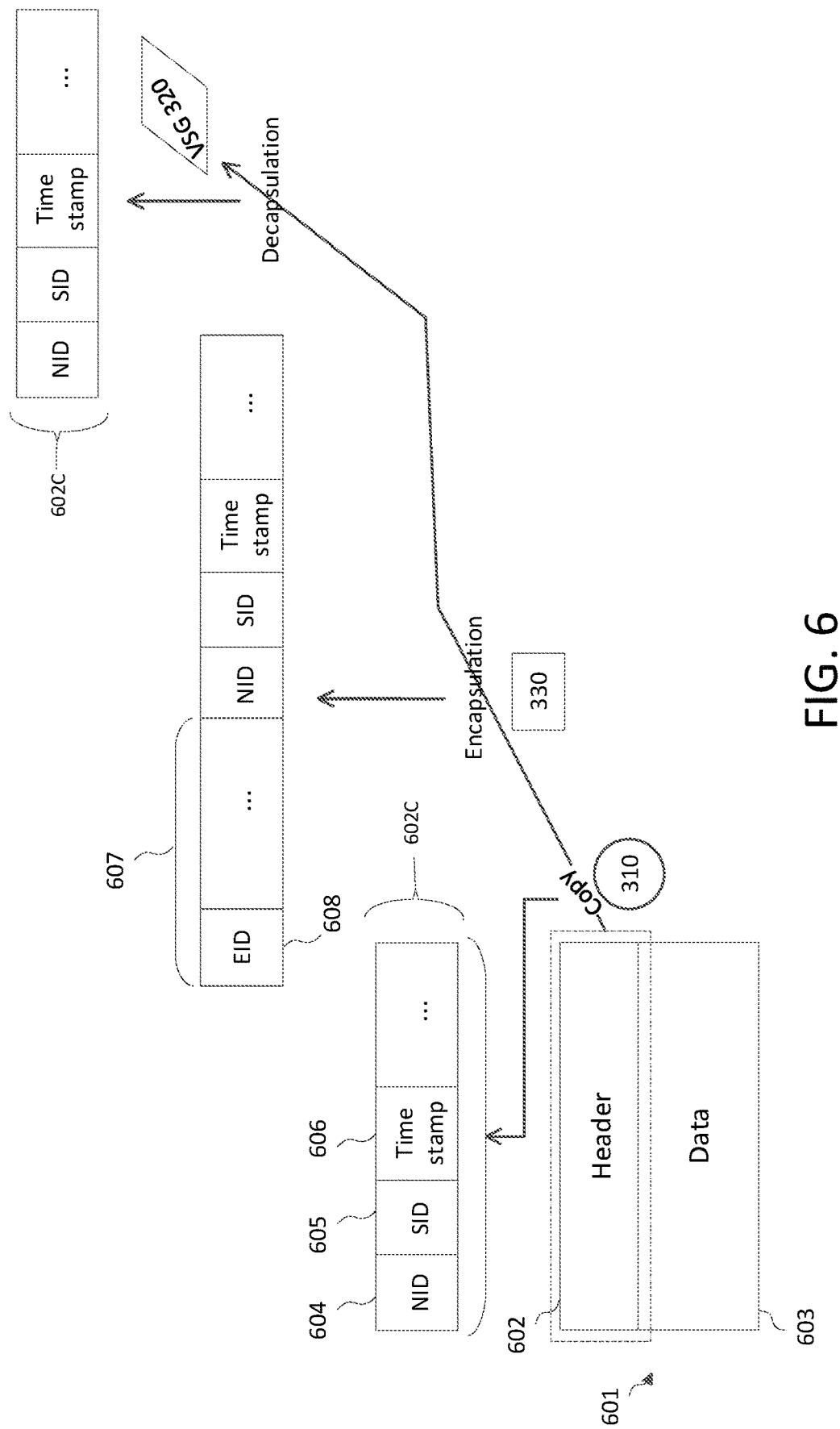
FIG. 6 shows an example of copying the header of an example packet and sending the header to gateway via a tunneling protocol.

FIG. 6 shows an example of copying the header 602 of an example packet 601 and sending the header 602 to gateway 320 via a tunneling protocol. As shown in FIG. 6, a packet 601 (e.g., an IPv4, IPv6 packet) may include a header 602 and data (or payload) 603. The header 602 may contain fields such as source address, destination address, type of service (or traffic class), length, protocol (next header), TTL (hop limit), etc. At a compute node 310, the header 602 of the packet 601 may be copied or replicated to produce a header copy 602C, using VCMTS application software and/or NIC at the compute node 310. Further, a node identifier (NID) 604, a stream (downstream or upstream) identifier (SID) 605, and a timestamp 606 may be added to the header copy 602C by the VCMTS application software and/or the NIC. The NID 604 may be used to indicate which compute node the packet 601 is replicated from. The SID 605 may be used to indicate if the packet 601 is an upstream packet or a downstream packet. The timestamp 606 may be used to track the time information of the packet, for the calculation of latency, etc. The lower-level switch 300 (in FIG. 3) connecting the compute node 310 with the gateway (e.g., VSG) 320 may have tunneling or packet forwarding function. At the interface 330 between the lower-level switch 300 and the compute node 310, the header copy 602C of the packet 601 may be encapsulated by the VCMTS application software and/or the NIC at the compute node 310. Specifically, an encapsulation tag 607 may be added to the header copy 602C. The encapsulation tag 607 may include an encapsulation identifier (EID) 608. For example, the encapsulation tag 607 may be a VLAN tag, and the EID 608 may be a VLAN ID. In some cases, the encapsulation tag 607 may further include fields such as TPID (tag protocol identifier), priority, CFI (canonical format identifier). The EID 608 may also include an indication of whether the packet is an upstream (US) ID or a downstream (DS) packet (using, e.g., a US ID or a DS ID). By tagging the header copy 602C with US or DS EIDs, replicated headers of upstream packets and downstream packets may be forwarded (or tunneled) to the gateway 320 separately, via a patch panel packet forwarding function of the lower-level switch 300. At the gateway 320, the encapsulated header copy 602C of the packet 601 may be decapsulated by the gateway (e.g., VSG) application software and/or the NIC at the gateway 320. Specifically, the encapsulation tag 607 may be removed. The header copy (or replicated header) 602C has reached the gateway 320 and the transmission has completed.

In some instances, the encapsulation tag 607 may be a VXLAN tag, and the EID 608 may be a VXLAN ID. The EID 608 may be a US ID or a DS ID. By tagging the header copy 602C with US or DS EIDs, replicated headers of upstream packets and downstream packets may be forwarded (or tunneled) to the gateway 320 separately, via a VXLAN method of the lower-level switch 300. At the gateway 320, the encapsulated header copy 602C of the packet 601 may be decapsulated. Specifically, the encapsulation tag 607 may be removed. The VXLAN method may use VXLAN tunnel endpoint (VTEP) devices for VXLAN encapsulation and decapsulation. For example, there may be a VTEP device at the compute node 310 for encapsulating the packet 601. There may be a VTEP device at the gateway 320 for decapsulating the packet 601. The VTEP device at the node side may send (e.g., transmit) the encapsulated packet (e.g., header) to the VTEP device at the gateway side which may decapsulate the packet.

In some cases, partially replicated packets (e.g., packets where only the headers have been replicated) may be used to track usage-related information such as user interaction with interactive content. For example, a user may visit a website, open an email, watch a video, listen to an audio, or click on an advertisement, etc. Tracking these interactions may be helpful for marketing purposes. One way to track user interaction with content may be using a tracking pixel (or a marketing pixel). A tracking pixel may be a 1×1 pixel-sized image that is usually invisible to the user (e.g., transparent, hidden, or embedded in the background), and that is placed over ads, in emails, and/or on web pages, etc. A tracking pixel code may contain an external link to a pixel server. If a user interacts with (e.g., visits, opens, loads, etc.) content such as a website, an email, etc. that has the tracking pixel, a HTML code may be processed by the user's browser which may send a request and/or follow the link to the pixel server and may load and/or open the tracking pixel image graphics. The pixel server may register the action in its log files every time the server gets an inquiry from the browser. In such a way the pixel server may track user interaction with content. If a tracking pixel loads, the loading may indicate that the ad, email, or page has been viewed. It may be beneficial to do local tracking of user interactions from gateway's side, because the log files of a pixel server of a website etc. may be unavailable to outsiders or hard to retrieve. By tracking user interactions using gateway (e.g., VSG), data that may be useful for marketing for different websites, platforms, service providers, etc., may be obtained and utilized. For example, for a particular compute node (e.g., VCMTS node) 310, a corresponding gateway (e.g., VSG) 320 may find that local users interact with ads on a pharmaceutical website more than with ads on an educational website. This information may indicate a local need or preference that may be useful for marketing. By replicating headers only, network I/O bandwidth may be reduced, and the gateway (e.g., VSG) may support at a higher customer scale.

Figures 7A, 7B:
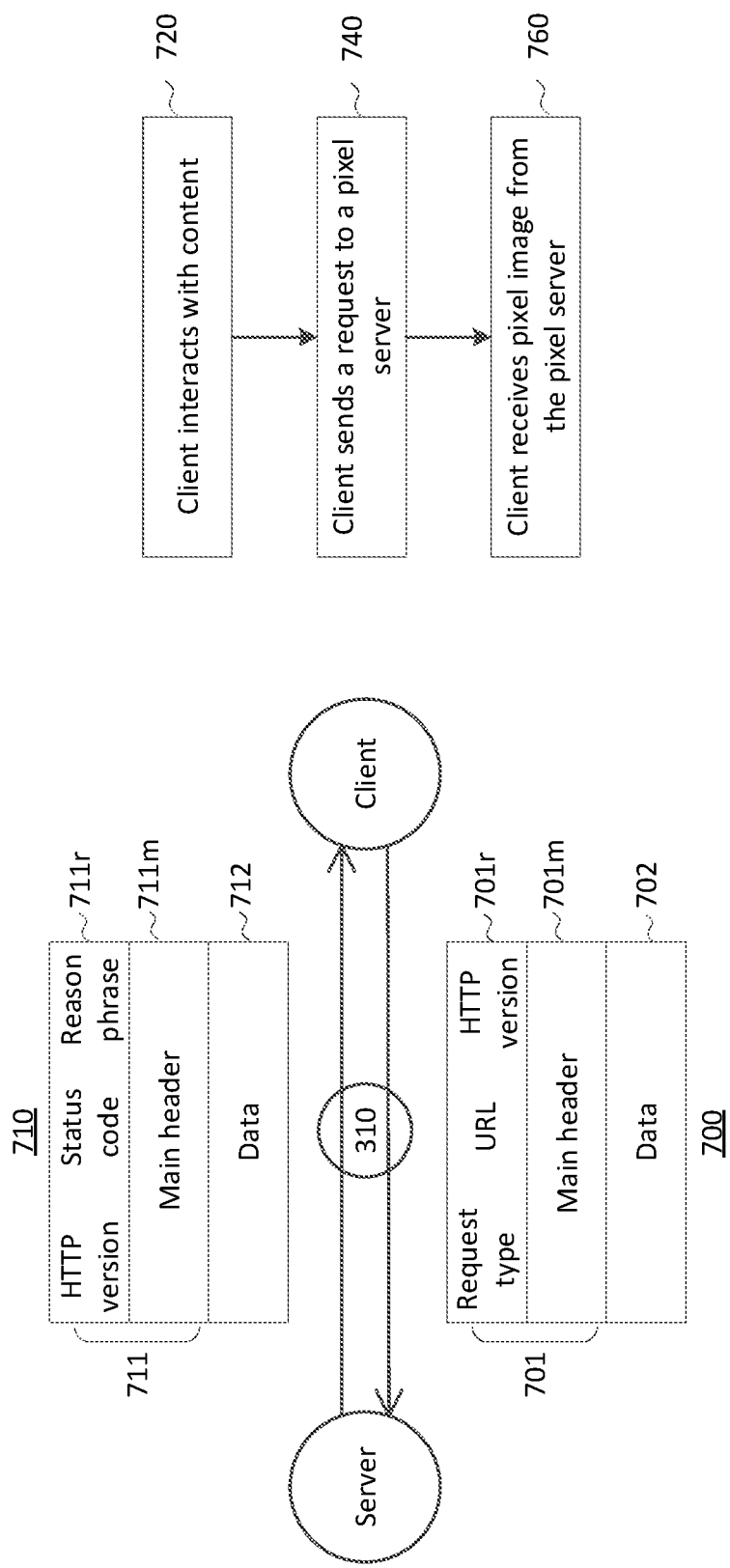
FIG. 7A and FIG. 7C show examples of data packets passing a compute node, the data packets being in relation to tracking user interaction with content.
FIG. 7B and FIG. 7D are flowcharts showing example processes in relation to tracking user interaction with content.
Figure 7C:
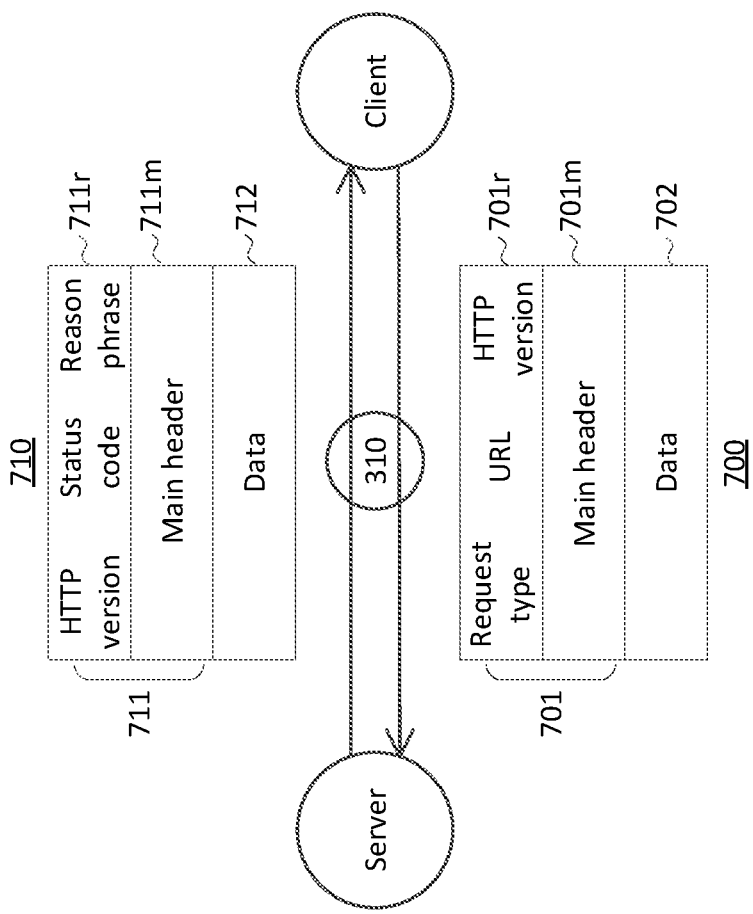
Figure 7D:
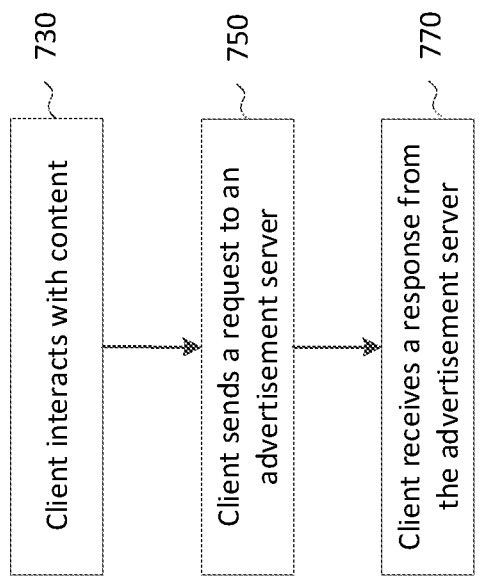

FIG. 7A or FIG. 7C shows an example of data packets passing a compute node 310, the data packets being in relation to tracking user interaction with content. FIG. 7B or FIG. 7D is a flowchart showing an example process in relation to tracking user interaction with content. As shown in FIG. 7B, for example, the tracking may be realized by using a tracking pixel. If a client (e.g., user) interacts with (e.g., clicks) content such as an advertisement that contains a tracking pixel (as indicated in step 720), a request may be generated (e.g., by JavaScript) and sent (e.g., by a browser where the advertisement is) to a pixel server (as indicated in step 740). The request may correspond to a request packet (e.g., HTTP request packet). The pixel server may respond by sending back a pixel image. The client may receive a pixel image from the pixel server (as indicated in step 760). The pixel image may correspond to a response packet (e.g., HTTP response packet). FIG. 7A shows an example of a request packet 700 and a response packet 710. The request packet 700 may go from the client (e.g., the user) side to the server (e.g., the pixel server) side, which may be called an upstream data packet or upstream packet. The response packet 710 may go from the server (e.g., the pixel server) side to the client (e.g., the user) side, which may be called a downstream data packet or downstream packet. Both packets may pass the compute node (e.g., VCMTS node) 310. The request packet 700 may comprise a header 701 and data 702. The header 701 may comprise a request line 701*r* and a main header 701*m*. The request line 701*r* may comprise a request type field, a Uniform Resource Locator (URL) field, and a HTTP version field separated by spaces. The request type field may specify the HTTP method being used for the request. HTTP defines several methods for interacting with web resources, such as GET, POST, PUT, and DELETE. In the context of requesting for a tracking pixel, the HTTP method may be GET, which is a common method used for retrieving resources from a server. The URL field is the path for the request, which specifies the resource being requested from the server. In FIG. 7A, the URL field may contain the URL of the pixel server. The HTTP version field specifies the version of the HTTP protocol being used for the request. The response packet 710 may comprise a header 711 and data 712. The header 711 may comprise a status line 711*r* and a main header 711*m*. The status line 711*r* may comprise a HTTP version field, a status code field, and a reason phrase field separated by spaces. The HTTP version field specifies the version of the HTTP protocol being used for the response. The status code may be a three-digit number that indicates the status of the HTTP request. For example, a status code of "200" indicates that the request was successful, and a status code of "404" indicates that the requested resource was not found. The reason phrase is a short description of the status code. For example, the reason phrase for a status code of "200" may be "OK", and the reason phrase for a status code of "404" may be "Not Found". The data 712 may contain the pixel image.

Referring back to FIG. 6, the data packets that are used for tracking user interaction with content (e.g., packets related to tracking pixels) may be replicated and sent to the gateway 320. The gateway 320 may determine tracking information and/or perform analysis for user interactions with content, based on the replicated packets. Specifically, the packets may be partially replicated (e.g., replicating the headers only) at the compute node 310. Partial replication may reduce the traffic at the link 335 (see FIG. 3), support better at higher customer scale, and reduce latency. For example, the request packet 700 may have header 701 copied at the compute node 310. The response packet 710 may have header 711 copied at the compute node 310. The replicated headers may be supplemented with a NID (node identifier) 604, a SID (stream identifier) 605, and a timestamp 606 by the VCMTS application software and/or the NIC. For example, an NID 604, an SID 605, and a timestamp 606 may be added to a replicated header of the header 701 of the request packet 700. A replicated header of the header 711 of the response packet 710 may be updated to include an NID 604, a SID 605, and a timestamp 606. At the interface 330 between the lower-level switch 300 (see FIG. 3) and the compute node 310, the replicated headers may be encapsulated by the VCMTS application software and/or the NIC at the compute node 310. Specifically, the replicated headers may include an encapsulation tag 607 which may comprise an EID (encapsulation identifier) 608. For example, the replicated header of the header 701 of the request packet 700 may also contain an EID. The replicated header of the header 711 of the response packet 710 may include an EID. When the encapsulated headers reach the gateway 320, the replicated headers may be decapsulated by the VCMTS application software and/or the NIC at the gateway 320. Specifically, the encapsulation tags 607 (including the EIDs, etc.) may be removed from the replicated headers. At the gateway 320, the replicated headers of the header 701 of the request packet 700 and/or the header 711 of the response packet 710 may be used for determining tracking information for user interactions with content. For example, the gateway 320 may work with the replicated header of the header 701 of the request packet 700. For example, the gateway 320 may check the URL field in the replicated header. For example, for a pixel request, the URL field may carry additional data besides an URL address. The additional data may comprise user behavior data collected for the pixel server. The gateway 320 may be programmed to determine if the replicated header belongs to a packet for requesting a pixel for user interaction tracking purpose, based on the URL and/or the additional data. Data packets related to content may be at least partially replicated at the compute node 310 and may be sent to the gateway 320 via a tunneling protocol. Similarly, each of the packets related to content may be provided with a NID, a SID, and a timestamp. They may be encapsulated and decapsulated using a tunneling protocol. The packets related to user interaction with content and the packets related to content may be considered as interrelated, by the gateway 320, based on information on the replicated headers of these packets, such as timestamps, source and/or destination addresses, URL field, etc. For example, a packet related to content may have the same source address as the packet related to user interaction (e.g., the request packet 700). These two packets may also have proximity in time. If the gateway 320 determines that a packet header belongs to a packet related to user interaction, the gateway 320 may associate the user interaction with a related packet (e.g., the header of a related packet). For example, the gateway 320 may identify a packet having proximity in time and a same source address as the related packet, and mark that related packet (e.g., packet header) as having been interacted with by a user. The related packet may belong to an advertisement, a web page, an email, etc. The header of the related packet may contain information identifying the content of the packet and the source. The gateway 320 may collect that information and send, to a management device 355 (e.g., performance server 122), that information as well as the mark of user interaction, for analysis and decision-making.

Although FIG. 7A and FIG. 7B have been described with a tracking pixel as an example for tracking user interaction with content (e.g., advertisements), other kinds of request packet and response packet may be used in connection with the gateway 320 tracking user interaction with content. For example, an application client may send an advertisement request (e.g., by a request packet) to an advertisement server, and may receive a response (e.g., a response packet) from the advertisement server. FIG. 7C and FIG. 7D describe examples of the packets and process. FIG. 7C and FIG. 7A may comprise substantially the same structures. Different from FIG. 7A, in FIG. 7C, the server may be an advertisement server. The request type may be POST which is a HTTP method used to send data to the server, such as user information or preferences, so that the server may select an appropriate advertisement for the user. The URL field may contain URL of the advertisement server. As shown in FIG. 7D, in step 730, a client (e.g., user) may interact with (e.g., click) content that may link to an advertisement. In step 750, a request may be generated and sent (e.g., by a browser where the advertisement is) to an advertisement server. The request may correspond to a request packet (e.g., HTTP request packet 700). In step 770, the client may receive a response from the advertisement server. The response may correspond to a response packet (e.g., HTTP response packet 710). Similar to the tracking pixel example, the request packet and/or the response packet may be at least partially replicated at the compute node 310 and sent to the gateway 320 for tracking (e.g., counting), for example, an advertisement click rate of the application client.

Figure 8:
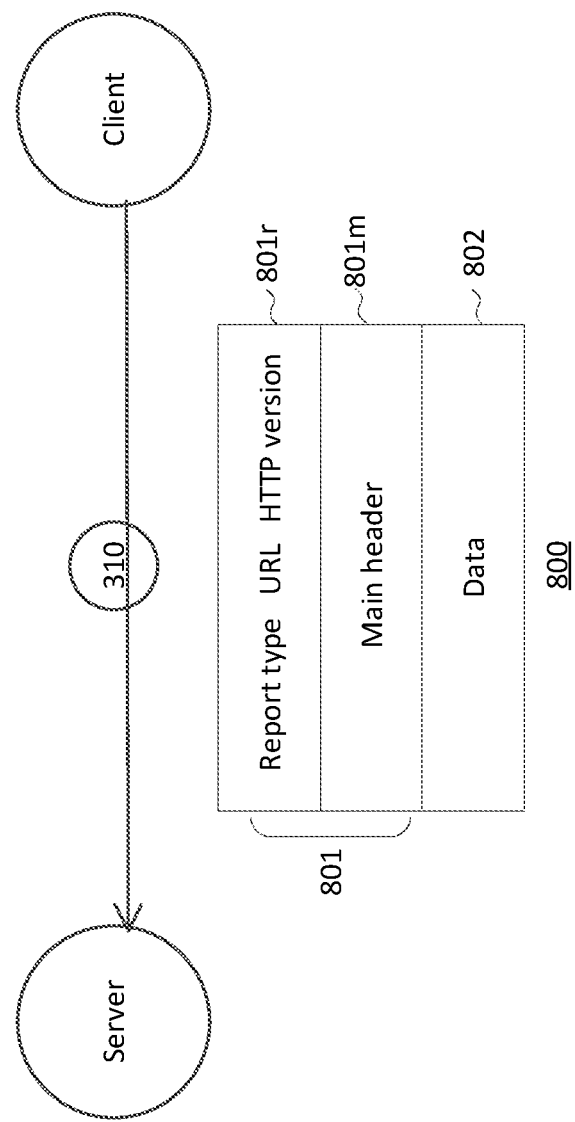
FIG. 8 shows another example of data packet passing a compute node, the data packet being in relation to tracking user interaction with content.

FIG. 8 shows another example of data packet passing a compute node 310, the data packet being in relation to tracking user interaction with content. In FIG. 8, a packet 800 may be sent from an application client to a server, for example, if a user clicks or touches his or her finger to a digital component (e.g., a play button of an advertisement video). The packet 800 may provide, to the server, an indication of the user interaction with the digital component. The packet 800 may comprise a header 801 and data 802. The header 801 may comprise a report line 801r and a main header 801m. The report line 801r may comprise a report type field, a URL field, and a HTTP version field separated by spaces. The URL field may contain the URL of the application client. Alternatively, the report line 801r may comprise a field that calls an Application Programming Interface (API) that reports the URL. Similar to what was described above, the packet 800 may pass the compute node 310 and may be replicated (e.g., partially replicated) and sent to the gateway 320. The gateway 320 may determine and/or track traffic data and/or information related to user interactions with interactive content, based on a replicated packet of the packet 800. For example, the gateway 320 may count the number of the replicated packet as the number of clicking and/or interacting with the content (e.g., ads) in relation to the URL. The gateway 320 may send the information to a management device 355 (e.g., performance server 122) for analysis and decision-making.

There may be other ways of tracking user interaction with content such as advertisement. As long as there may be one or more packets passing the compute node 310 and the one or more packets may contain information related to user interaction with content, the gateway 320 may determine interaction tracking information based on received at least partially replicated packet(s) of the one or more packets associated with the compute node 310. The compute node 310 may be programmed to identify and/or determine if a packet is associated with user interaction with interactive content, for example, based on the header information of the packet. The compute node 310 may replicate the determined packet, for example, by replicating the header. The replicated packet may be sent to the gateway 320 using a tunneling protocol. By performing the tracking at a node level, faster analysis and response may be realized based on information related to local nodes. Also, determining needed capacity of the gateway and/or scaling the gateway may become easier, compared to handling an aggregated workload of the full VCMTS network. By replicating packets for analysis, network traffic availability may be improved.

Figure 9:
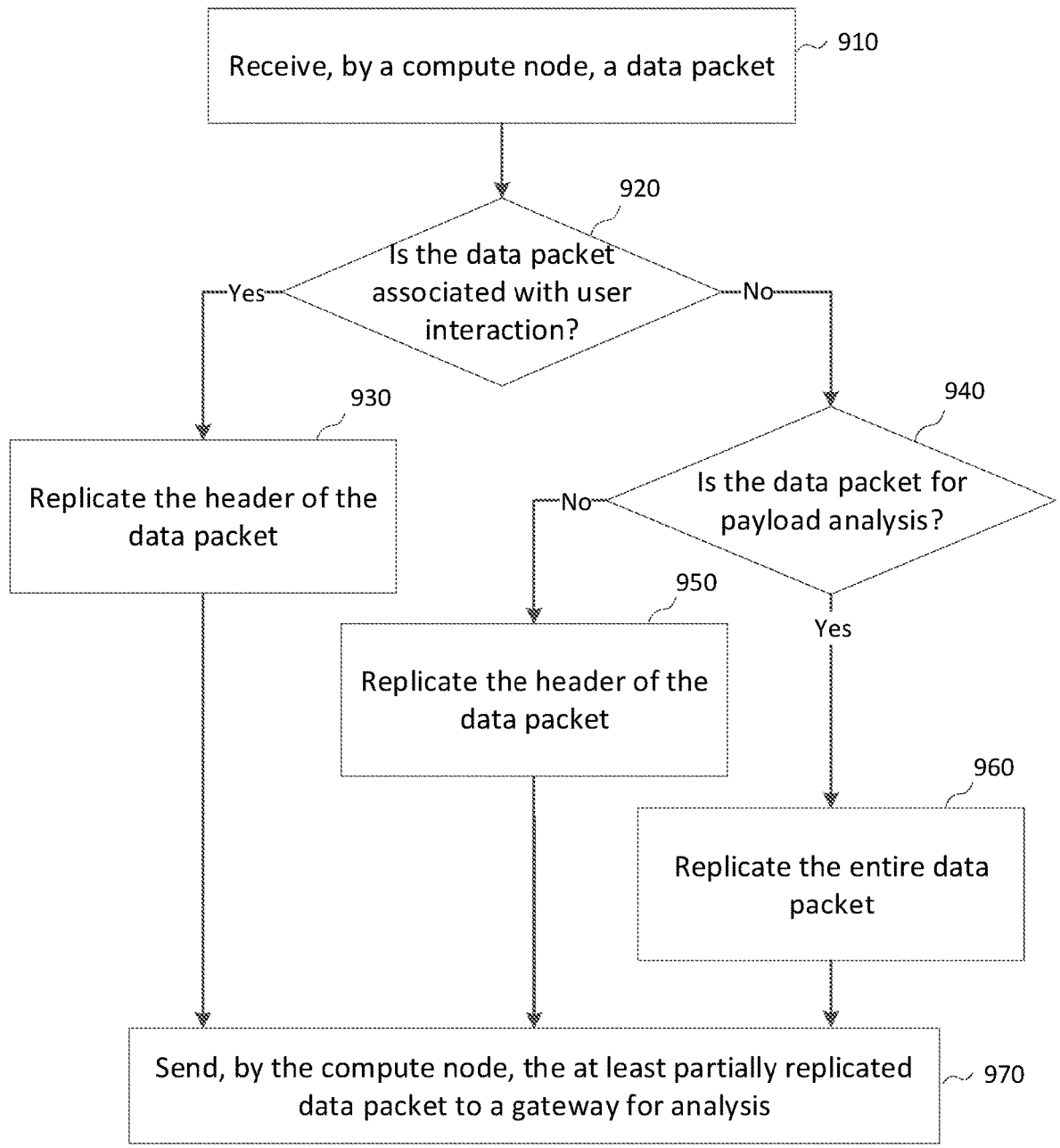
FIG. 9 is a flowchart showing an example method of replicating data packets in different ways based on different packets and/or analysis purposes.

FIG. 9 is a flowchart showing an example method 900 of replicating data packets in different ways based on different packets and/or analysis purposes. In the example method 900, a compute node (e.g., VCMTS node) 310 may identify data packets in relation to user interaction with interactive content. The compute node 310 may also identify data packets intended for in-depth analysis. For convenience, the example method 900 is explained below using an example in which steps may be performed by the compute node 310. However, one, some, or all steps of the example method may also or alternatively be performed by one or more other computing devices (e.g., NIC). One or more steps of the example method may be rearranged (e.g., performed in a different order), omitted, and/or otherwise modified, and/or other steps added.

In step 910, a compute node (e.g., VCMTS node) 310 may receive a data packet. The data packet may be one of a plurality of data packets. These data packets may comprise upstream packets and downstream packets, as indicated in FIGS. 3, 4, and 5. For example, the upstream packets may comprise request packets 700 and 800 (in FIGS. 7A-7D and 8). The downstream packets may comprise response packets 710 (in FIGS. 7A and 7C). The plurality of data packets may comprise packets related to content such as videos, web pages, advertisements, etc.

In step 920, it may be determined if the data packet is associated with user interaction with interactive content. For example, the VCMTS application software and/or NIC at the compute node 310 may be programmed to determine if a data packet is associated with user interaction. For example, the determination may be made based on one or more fields in the packet header. The one or more fields may comprise first line in the header, the URL, and/or other fields that may indicate user interaction (e.g., request, response, etc.). For example, as described above in connection with FIGS. 7A-7D, and FIG. 8, if an URL field of a packet header contains user behavior data, the packet may be determined as being associated with user interaction. If a first line of a packet header contains request for an advertisement and the header contains an indication of user interaction, the packet may be determined as being associated with user interaction with the advertisement. Any known packet analysis technologies may be applied to program the compute node 310 (e.g., the VCMTS application software and/or NIC) to identify packets that are associated with user interaction with interactive content, based on information contained in the packet headers. Information about upstream or downstream direction of a packet may also be used to determine the packet's association with user interaction. The result of determination may be marked, for example, by providing a data packet with an identifier or mark (e.g., ID number) to indicate that the data packet is associated with user interaction. The marking may be helpful for subsequent analysis by, for example, the gateway 320. If it is determined that the data packet is associated with user interaction with interactive content, in step 930, the header of the data packet may be replicated. If it is determined that the data packet is not associated with user interaction with interactive content, in step 940, further determination may be made.

In step 930, the header of the data packet may be replicated. For example, the VCMTS application software and/or NIC at the compute node 310 may be programmed to replicate the headers only. By copying the header instead of the whole packet which may have a bigger size, traffic availability may be improved. As described above in connection with FIG. 6, identifiers such as NID, SID may be added to the copied header to mark the compute node and upstream/downstream direction of the data packet. The data packet may also be marked to indicate its association with user interaction, as described above.

In step 940, it may be determined if the data packet is for payload analysis. Payload analysis involves examining the data or content carried within the payload section of data packets, and is an in-depth analysis compared to header analysis that focuses on packet headers only. Examples of payload analysis may include content inspection (e.g., data loss prevention, intrusion detection, content filtering, etc.), media analysis (e.g., audio or video data quality assessment, troubleshooting for streaming problems, etc.), protocol compliance verification (e.g., verification of the syntax, structure, and semantics of the data exchanged, according to relevant application-layer protocols), and/or so on. For example, the VCMTS application software and/or NIC at the compute node 310 may be programmed to determine if a data packet is for payload analysis, based on information in the packet header. For example, data packets from a predetermined URL may be designed to receive payload analysis. For example, a website that has high security needs may benefit from an in-depth analysis to examine the data content in the packets. If it is determined that a data packet is for payload analysis, in step 960, the entire data packet may be replicated. If it is determined that a data packet is not for payload analysis, in step 950, the process 900 may determine not replicate the entire packet and to only replicate the header of the data packet to, among other things reduce the size, as described above.

In step 950, the header of the data packet may be replicated, in a way similar to that in step 930. Identifiers such as NID, SID may also be added to the copied header.

In step 960, in contrast to when it is determined that only a portion of the data packet should be replicated, the entire data packet may be replicated. As discussed above, this occurs when it is determined that the data packet is for payload analysis. For example, the VCMTS application software and/or NIC at the compute node 310 may be programmed to replicate the entire data packet. The replicated data packet may have a header (e.g., header 602 in FIG. 6) and data (or payload) (e.g., data 603). Information in both the header and the data may be used for analysis in the gateway (e.g., VSG) 320.

In step 970, the at least partially replicated data packet may be sent to the gateway 320. As shown in FIG. 9, the replicated header from step 930 or step 950 may be sent to the gateway 320. Alternatively, the replicated entire data packet from step 960 may be sent to the gateway 320. Replicated packets (e.g., headers or entire packets) may be analyzed in the gateway 320 for different purposes. For example, the header associated with user interaction with interactive content may be analyzed for interaction tracking information as described above. The other headers may receive analyses such as quality of service (QOS) assessment, traffic monitoring, billing and accounting. For example, packet loss, transmission delay, etc. may be measured using known packet analysis technologies based on quantities, time information, identification information, etc. of replicated headers. Billing records may be generated by analyzing header fields such as source and destination IP addresses, ports, or application-specific information. For example, the entire packet may receive in-depth quality assurance analysis such as payload analysis as described above. By replicating data packets in different ways based on different packets and/or analysis purposes, replication workload at the compute node 310 and the data size to the gateway 320 may be reduced, and traffic of a larger scale may be served.

Figure 10:
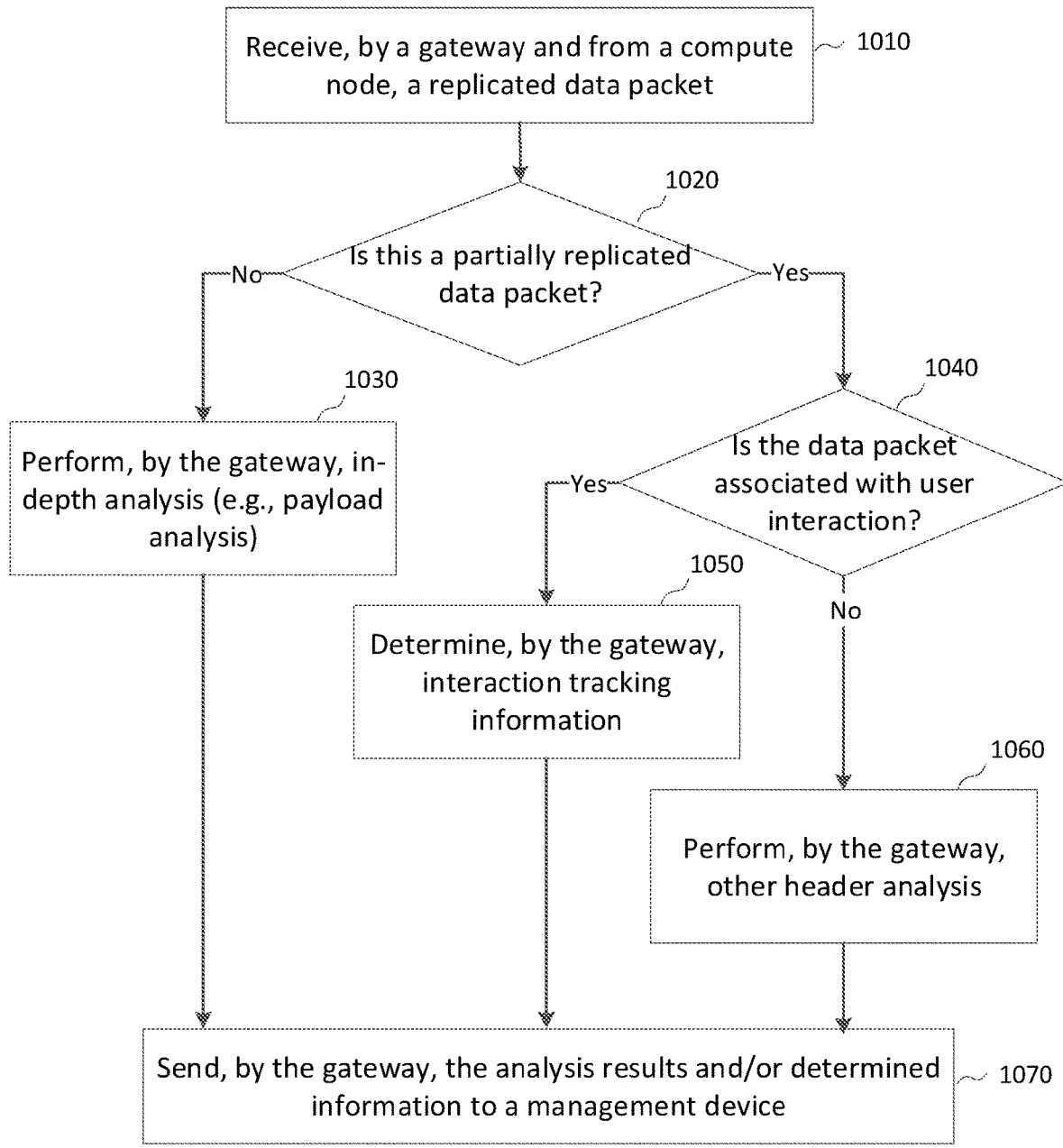
FIG. 10 is a flowchart showing an example method of performing analysis by a gateway.

FIG. 10 is a flowchart showing an example method 1000 of performing analysis by a gateway (e.g., VSG) 320. In the example method 1000, the gateway 320 may identify differently replicated data packets. The gateway 320 may also identify replicated data packets associated with user interaction with interactive content. For convenience, the example method 1000 is explained below using an example in which steps may be performed by the gateway 320. However, one, some, or all steps of the example method may also or alternatively be performed by one or more other computing devices (e.g., NIC). One or more steps of the example method may be rearranged (e.g., performed in a different order), omitted, and/or otherwise modified, and/or other steps added.

In step 1010, a gateway (e.g., VSG) 320 may receive, from a compute node (e.g., a VCMTS node) 310, a replicated data packet. The replicated data packet may be one of a plurality of at least partially replicated data packets. For example, the replicated data packet may be a replicated packet header (e.g., header 602). For example, the replicated data packet may be an entire data packet. The replicated header or entire data packet may include a node identifier (e.g., NID 604) to track the node and a stream identifier (e.g., SID 605) to track a moving direction (e.g., downstream or upstream) of a related packet. The replicated header may also include a mark to indicate its association with user interaction. These replicated data packets may be sent to the gateway 320 via a tunneling protocol (e.g., patch panels, VXLAN, etc.), as described above.

In step 1020, it may be determined if the replicated data packet is a partially replicated data packet (e.g., replicated header only). For example, the gateway 320 (e.g., VSG application software and/or the NIC at the gateway 320) may be programmed to determine if a replicated data packet has a payload or not. If it is determined that the replicated data packet is not a partially replicated data packet (i.e., has a payload), in step 1030, an in-depth analysis may be performed. If it is determined that the replicated data packet is a partially replicated data packet (e.g., header only), in step 1040, further determination may be made.

In step 1030, an in-depth analysis may be performed, for example, by the gateway 320. The in-depth analysis may be a payload analysis as describe above. For example, the payload of the replicated data packet may be examined and the result may be used to form an analysis conclusion. For example, if intrusion detection is to be performed, the gateway (e.g., VSG) 320 may be programmed to identify known attack signatures, suspicious command sequences, etc. from the payload. The examination results may accumulate as more replicated data packets are analyzed, to form conclusions that are based on patterns.

In step 1040, further determination may be made as to whether the partially replicated data packet is associated with user interaction. For example, the gateway 320 (e.g., VSG application software and/or the NIC at the gateway 320) may be programmed to identify if a replicated header has a mark (e.g., ID number) that is associated with user interaction. If it is determined that the partially replicated data packet is associated with user interaction, in step 1050, interaction tracking information may be determined. If it is determined that the partially replicated data packet is not associated with user interaction, in step 1060, other header analysis may be performed.

In step 1050, the interaction tracking information may be determined, for example, by the gateway 320. For example, the gateway 320 (e.g., VSG application software and/or the NIC at the gateway 320) may be programmed to determine the interaction tracking information (e.g., number/quantity/count, time, related content (e.g., source address), etc.) based on header information such as the URL field, as described above. The interaction tracking information may accumulate as more replicated headers are analyzed, and may be node specific. For example, the gateway 320 may determine how many packets associated with user interaction there are for a particular compute node 310, based on the node identifiers (e.g., NID 604). For example, the gateway 320 may count the number of replicated headers associated with user interaction. The gateway 320 may relate the counted number with corresponding content (e.g., ads) from a source address. The determination of interaction tracking information (e.g., for ads) may be realized by known packet analysis technologies. Such node-level determination and/or statistics may be used for targeted analysis, diagnosis, etc., which may be useful for various applications and/or decision-making, for example, local and/or micro advertisement strategy, video provider customization, etc.

In step 1060, other header analysis may be performed, for example, by the gateway 320. For example, the gateway 320 (e.g., VSG application software and/or the NIC at the gateway 320) may be programmed to determine, for the compute node 310, traffic data such as QoS, based on replicated headers. For example, the traffic data related to QoS may comprise quantities, time information, identification information, etc. of data packets. The traffic data may be obtained by known packet analysis technologies. Packet loss, transmission delay, etc. may be measured through analysis on these traffic data.

In step 1070, the gateway 320 may send the analysis results and/or determined information such as the determined interaction tracking information to a management device 355 (e.g., performance server 122). The management device 355 may analyze the results and/or information, may generate report and/or alert, and/or may generate decisions and/or instructions. For example, the management device 355 may identify a response time issue for a video (e.g., significant delay in transmission), and may instruct a server to change priority of service providers. For another example, the management device 355 may send instructions for resending targeted advertisements, based on user interaction information (e.g., a large quantity of user interactions with certain targeted advertisements, showing relevancy and/or popularity of these advertisements). The gateway 320 may send the information, data, and/or analysis results to the management device 355 regularly or in real time. The gateway 320 may send all or part of the outputs from step 1030, step 1050, and step 1060 to the management device 355. Correspondingly, packet replication steps (steps 930, 950, and 960) in FIG. 9 may be all or partly performed. For example, if an in-depth analysis is not needed, the step 960 and the step 1030 may not be performed. For another example, in a situation of focusing on advertisement tracking, the compute node 310 may only perform step 930 and the gateway 320 may send only the interaction tracking information from step 1050 to the management device 355. The adjustments to the example methods 900 and 1000 may further reduce the workload and increase bandwidth capability.

Figure 11:
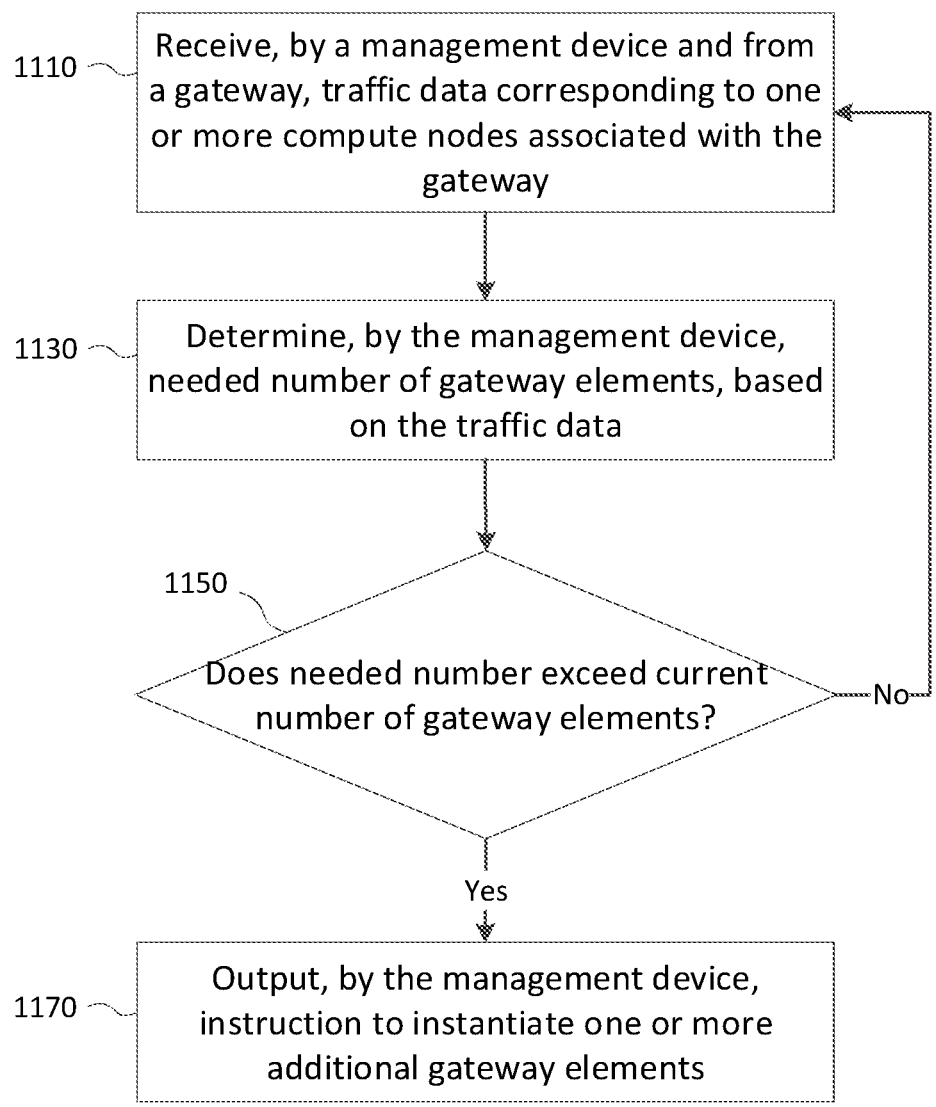
FIG. 11 is a flowchart showing an example method of scaling the gateway.

FIG. 11 is a flowchart showing an example method 1100 of scaling the gateway (e.g., VSG) 320. In the example method 1100, a management device 355 (e.g., performance server 122) may be used to make decision on the scaling of the gateway 320. For convenience, the example method 1100 is explained below using an example in which steps may be performed by the management device 355. However, one, some, or all steps of the example method may also or alternatively be performed by one or more other computing devices (e.g., gateway 320). One or more steps of the example method may be rearranged (e.g., performed in a different order), omitted, and/or otherwise modified, and/or other steps added.

In step 1110, the management device 355 may receive, from gateway 320, traffic data corresponding to one or more compute nodes (e.g., VCMTS nodes) 310 associated with the gateway 320. The traffic data may comprise quantities, time information, identification information, interaction tracking information, etc. of replicated data packets. The traffic data may also include processed information such as analysis results obtained by calculation based on usual traffic data, for example, maximum quantity of packets passing a compute node 310, average response time (e.g., calculated by averaging the results of response time minus request time, based on time information of packets), etc. The receiving of traffic data may occur regularly or in real time.

In step 1130, the management device 355 may determine needed number of gateway elements, based on the traffic data. Each gateway 320 may comprise a set of or a number of gateway elements (e.g., VSG elements 320-1, 320-2, as shown in FIG. 5). An individual gateway element may have a fix capacity. The needed capacity of one or more compute nodes 310 associated with the gateway 320 may be determined based on the traffic data. As packets are at least partially replicated at the one or more compute nodes 310, a correspondingly needed capacity of the gateway 320 may be determined based on the needed capacity of the one or more compute nodes 310 associated with the gateway 320. By dividing the needed capacity of the gateway 320 with the fixed capacity of each gateway element, needed number of gateway elements may be obtained.

In step 1150, a determination may be made by the management device 355 as to whether the needed number of gateway elements exceeds a current number of gateway elements. If the management device 355 determines that the needed number of gateway elements does not exceed the current number of gateway elements, the management device 355 may in step 1110 continue receiving traffic data from the gateway 320. If the management device 355 determines that the needed number exceeds the current number of gateway element, the management device 355 may in step 1170 output instruction to instantiate one or more additional gateway elements.

In step 1170, the management device 355 may output an instruction which may contain a number and/or quantity of gateway elements needed to be instantiated. For example, if the needed number of gateway elements determined in step 1130 is three and the current number of gateway elements is two, the management device 355 may instruct the addition of at least two gateway elements. The gateway elements may be manually added, for example, if they run on bare metal. The gateway elements may be virtually added, for example, if they are containerized.

The management device may have been described as a separate unit from the gateway; however, the management device may be part of the gateway. Although examples in this specification may use partially replicated packets, fully replicated packets may also apply as long as there is bandwidth for the extra size.

Any WAN access technology such as DOCSIS, EPON, LTE, 5 G, etc., may be utilized. The example in this specification shows DOCSIS, but is not limited to that access technology.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
  receiving, by a gateway executing on a computing device, and from each of a plurality of compute nodes, a plurality of partially replicated data packets;
  determining, by the gateway and based on the plurality of partially replicated data packets, traffic data that comprise, for each compute node of the plurality of compute nodes, one or more of:
quantities of partially replicated data packets associated with the compute node,
time information of partially replicated data packets associated with the compute node,
identification information of partially replicated data packets associated with the compute node, or
interaction tracking information of partially replicated data packets associated with the compute node; and
sending, by the gateway and to a management device, at least a portion of the traffic data for each compute node of the plurality of compute nodes.

2. The method of claim 1, wherein each of the partially replicated data packets consists of a packet header.

3. The method of claim 1, wherein the plurality of partially replicated data packets comprise:
partially replicated upstream data packets; and
partially replicated downstream data packets; and
wherein the partially replicated upstream data packets and the partially replicated downstream data packets are marked for differentiating upstream and downstream packets.

4. The method of claim 1, further comprising receiving, by the gateway and from the management device, one or more instructions based on the traffic data sent to the management device by the gateway.

5. The method of claim 1, wherein the plurality of partially replicated data packets are encapsulated, and wherein the receiving the plurality of partially replicated data packets by the gateway and from each compute node comprises:
decapsulating the plurality of partially replicated data packets at the gateway.

6. The method of claim 1, wherein at least one of the partially replicated data packets associated with a compute node is marked, at the compute node, for being associated with user interaction with interactive content.

7. The method of claim 1, wherein each of the partially replicated data packets indicates its originating compute node.

8. The method of claim 1, wherein the gateway comprises a set of gateway elements, and wherein the set is changeable based on the traffic data sent to the management device by the gateway.

9. The method of claim 1, further comprising:
receiving, by the gateway and from the management device, an instruction to instantiate an additional gateway element, based on the traffic data sent to the management device by the gateway, wherein the traffic data indicate a need for one or more additional compute nodes or additional capacity at one or more compute nodes; and
instantiating, by the gateway and based on the instruction, the additional gateway element.

10. The method of claim 1, further comprising:
receiving, by the gateway and from each of the plurality of compute nodes, a second plurality of partially replicated data packets associated with advertisements;
determining, by the gateway and based on the second plurality of partially replicated data packets, and for each of the plurality of compute nodes, user interaction information with the advertisements; and
sending, by the gateway and to the management device, the user interaction information.

11. A method comprising:
receiving, by a gateway executing on a computing device, and from each compute node of a plurality of compute nodes, a plurality of partially replicated data packets associated with advertisements;
determining, by the gateway, based on the plurality of partially replicated data packets, and for each compute node of the plurality of compute nodes, user interaction information with the advertisements; and
sending, by the gateway and to a management device, the user interaction information.

12. The method of claim 11, wherein the partially replicated data packets comprise partially replicated upstream data packets and downstream data packets, and wherein the partially replicated upstream data packets and downstream data packets are marked for differentiating upstream and downstream packets.

13. The method of claim 11, wherein the plurality of partially replicated data packets are encapsulated, and wherein the receiving the plurality of partially replicated data packets by the gateway and from each compute node comprises:
decapsulating the plurality of partially replicated data packets at the gateway.

14. The method of claim 11, wherein the partially replicated data packets comprise partially replicated upstream data packets and partially replicated downstream data packets, and wherein the partially replicated upstream data packets and partially replicated downstream data packets are encapsulated with different IDs for differentiating upstream and downstream packets.

15. The method of claim 11, wherein each of the partially replicated data packets indicates its originating compute node.

16. The method of claim 11, wherein the gateway comprises a containerized gateway.

17. The method of claim 11, further comprising sending, by the management device and based on the user interaction information, one or more instructions for resending targeted advertisements.

18. A method comprising:
receiving, by compute nodes, user data packets;
determining user data packets, of the received user data packets, associated with user interaction with interactive content;
replicating headers, of the determined user data packets, based on the determined user data packets being associated with user interaction with interactive content; and
sending the replicated headers to a gateway executing on a computing device.

19. The method of claim 18, wherein each of the replicated headers comprises a field to differentiate upstream and downstream packets.

20. The method of claim 18, wherein each of the replicated headers indicates its originating compute node.

21. The method of claim 18, wherein the sending replicated headers comprises encapsulating the replicated headers with different IDs for differentiating upstream and downstream packets.

22. A system comprising:
a virtual services gateway (VSG) executing on a computing device;
a plurality of virtual cable modem termination system (VCMTS) nodes of a VCMTS;
a switching device; and
a managing device, wherein the VSG is connected with the plurality of VCMTS nodes via the switching device, wherein each of at least a portion of the plurality of VCMTS nodes is configured to at least partially replicate data packets, and to send the at least partially replicated data packets to the VSG using an encapsulation protocol, wherein the VSG is configured to determine, based on the at least partially replicated data packets, information associated with user interaction with interactive content, and wherein the VSG is configured to send the determined information to the managing device for making management decisions associated with the interactive content.

* * * * *